INVENTOR
William E. Westell
BY
Morse, Altman & Oates
ATTORNEYS

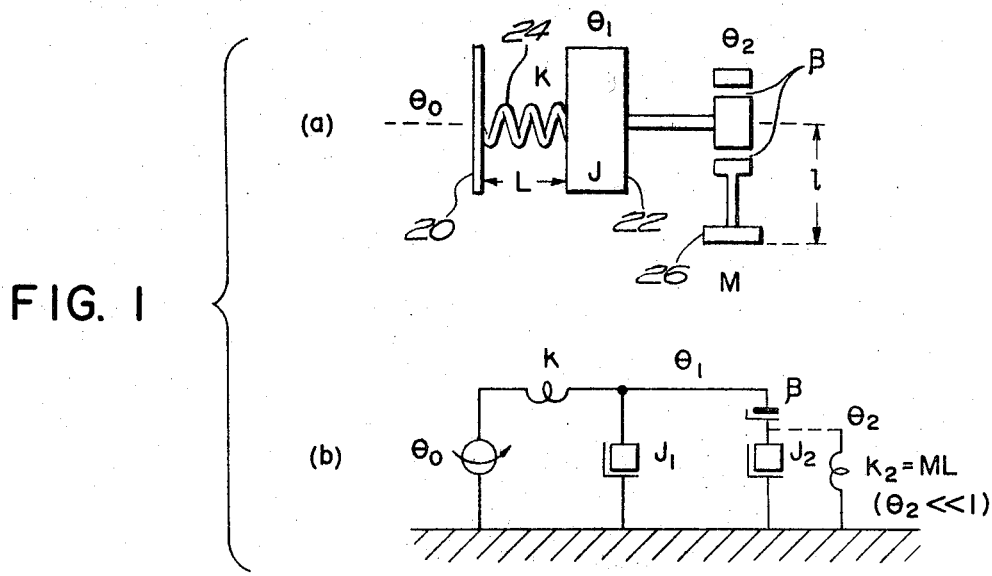
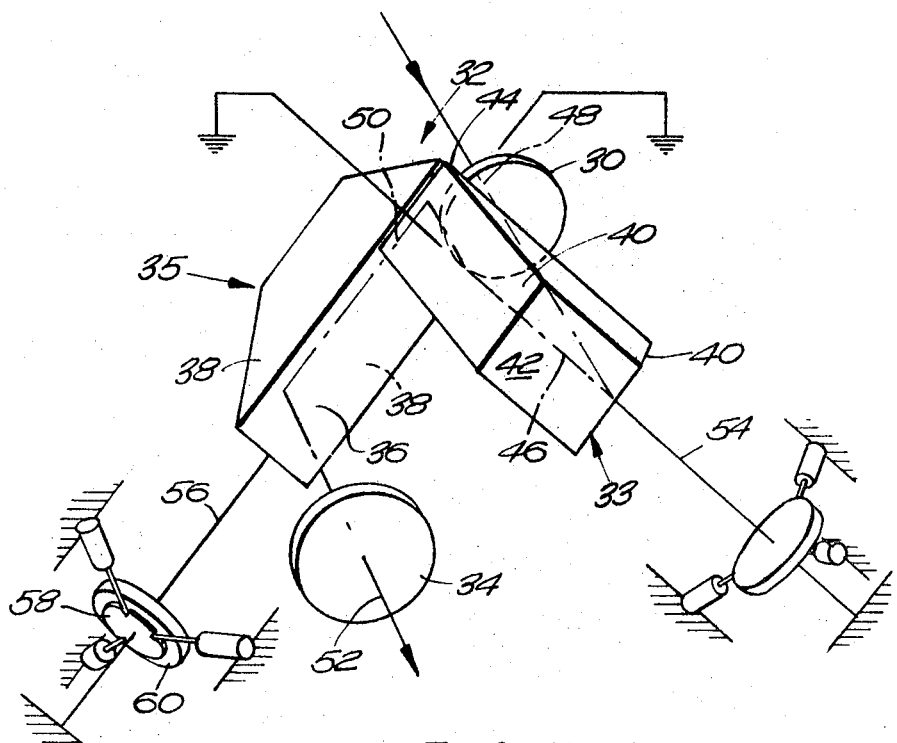
FIG. 1
FIG. 2
INVENTOR
William E. Westell
BY Morse, Altman & Oates
ATTORNEYS

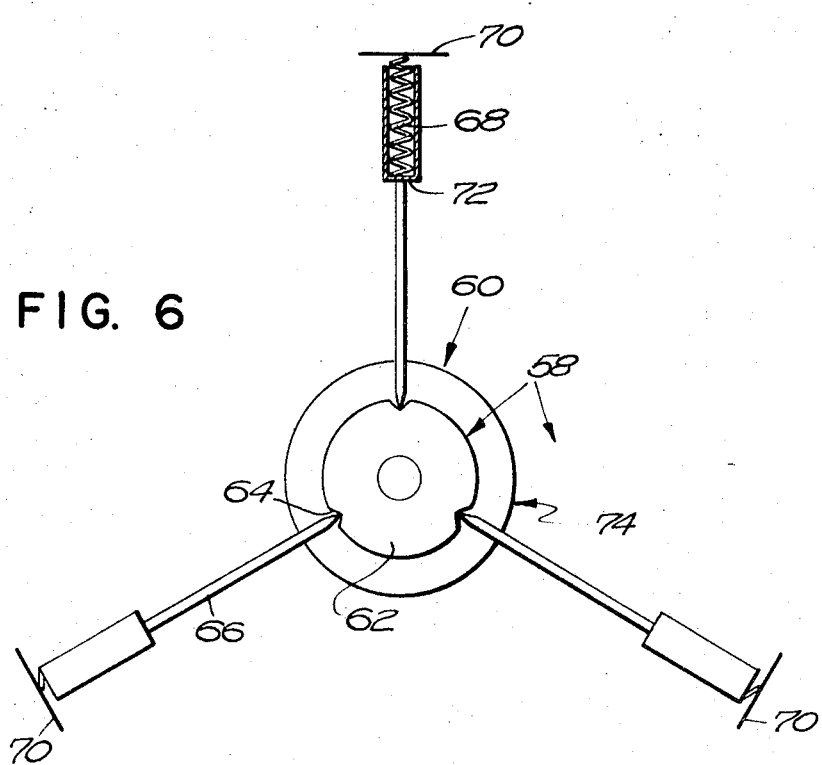
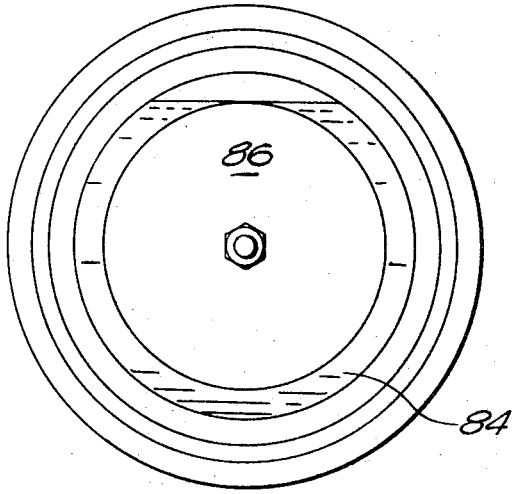
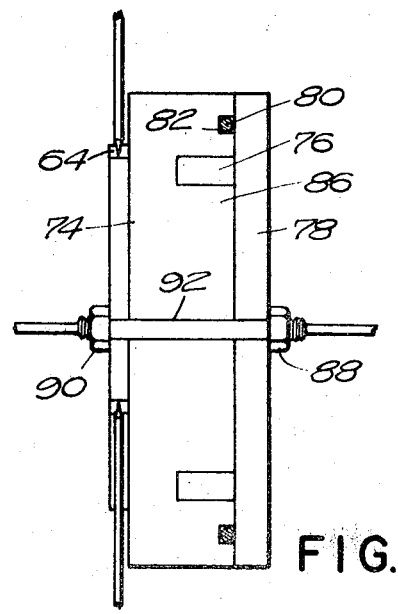

United States Patent Office 3,558,211
Patented Jan. 26, 1971

3,558,211
MECHANICAL MEANS FOR INERTIALLY STABILIZING OPTICAL SYSTEM AGAINST IMAGE MOTION
William E. Westell, Weston, Mass., assignor to Baird-Atomic, Inc., Cambridge, Mass., a corporation of Massachusetts
Filed May 8, 1968, Ser. No. 727,550
Int. Cl. G02b 23/00
U.S. Cl. 350—16                                                12 Claims

ABSTRACT OF THE DISCLOSURE

In order to isolate the image produced by an optical system from angular vibration or the like, at least one of the optical components is established as a predetermined inertial mass, the inertial mass is mounted on a resilient suspension of predetermined compliance, and the inertial mass is connected to a damping control of predetermined rate.

BACKGROUND AND SUMMARY

The present invention relates to the stabilization of an image in an optical system, and more particularly, to image motion compensation in optical equipment which is subject to vibration or the like but which is required to produce an image that is motion free, for example, for direct observation in binoculars or for photoexposure in a camera. Typical prior image stabilizing systems have involved relatively complex motion sensing and servo control techniques that are not applicable to a variety of simple, compact and inexpensive instruments.

The primary object of the present invention is to provide an optical system in which one or more of the optical components is isolated from vibration or the like by specifying the inertial mass of the component (including any mass operatively connected thereto), mounting the mass on a resilient suspension of sufficiently low compliance to permit low frequency responses to vibrations or the like within a limited range of tolerance, and damping such low frequency responses in order to enable them to cancel each other effectively. In one form, one or more of the roll, pitch and yaw of the optical system are isolated independently by communicating respective optical elements (e.g., prisms) each of which has its own torsion suspension. In this case, for example, damping the movement of each optical element is determined by an associated rotational cavity containing a fluid of specified viscosity.

Other objects of the present invention will in part be obvious and will in part appear hereinafter.

The invention accordingly comprises the devices, components and interrelationships which are exemplified in the disclosure hereof, the scope of which will be indicated in the appended claims.

BRIEF DESCRIPTION OF DRAWING

For a fuller understanding of the nature and objects of the present invention, reference should be had to the following detailed description, taken in connection with the accompanying drawings, wherein:

FIGS. 1(a) and 1(b) schematically illustrate certain principles of the present invention;

FIG. 2 is a perspective, schematic view of the mechanical and optical components of one-half of binoculars, embodying the present invention;

FIG. 6 is a detail front view of one of the compliant suspensions of the binoculars of FIG. 3;

FIG. 7 is a detail front view of one of the damping controls of the binoculars of FIG. 3, partly broken away;

FIG. 8 is an end view of the damping control of FIG. 7;

DETAILED DESCRIPTION

Introduction

Figure 3:
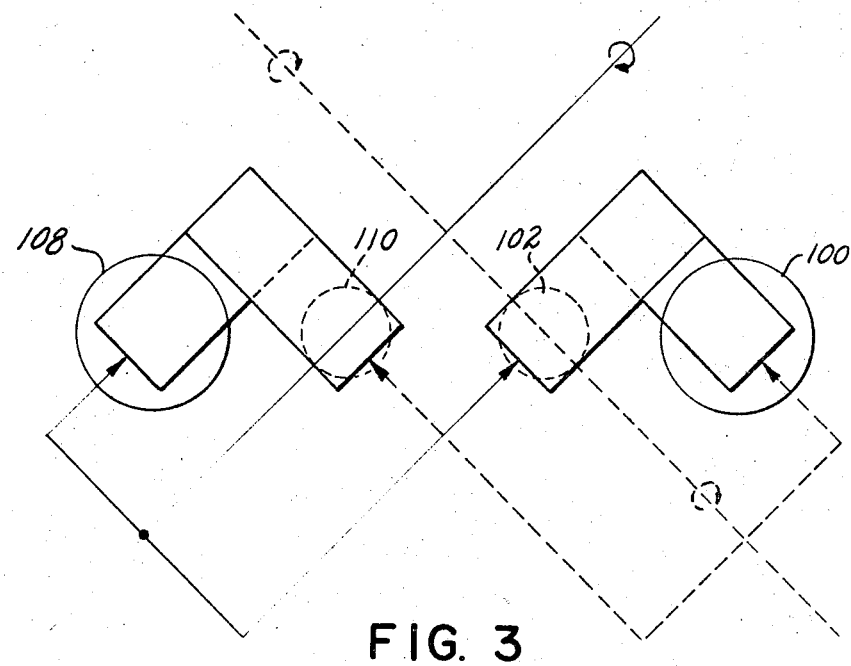
FIG. 3 is a front view of the binoculars of FIG. 1, with parts omitted for clarity.

In accordance with the present invention, simple, lightweight, compact, inexpensive, purely mechanical, inertial image-motion-compensation is achieved in the following manner:

(1) Single axis rotational isolation from vibration is provided by gimballing a prism, mirror or other path deflecting component of the optical system. Plural axis rotational isolation is provided by respectively gimballing a plurality of such path deflecting components. Gimballing freedom of only a few angular degrees is adequate in most applications (e.g., hand-held binoculars) so that each prism simply may be gimballed directly to the optical housing (in contradistinction to the more complex inner-outer ring configurations).

(2) Such gimballing is provided in any single axis by a translationally rigid suspension, which is characterized by a very large compliance (i.e. low stiffness) provided by a combination of negative compliance (toggle) radial suspension (e.g., rod or taut band). Such a low compliance is required for low isolation frequencies with small inertias.

(3) Such a large compliance is selected for non-linearity in order to satisfy acquisition requirements for rapid slewing. In other words, compliance is decreased and response time is decreased at larger deflections, i.e., sensitivity to larger (usually intentional) deflections is selected to be zero.

(4) Gravitational damping of such single axis rotation performs the rate gyro function of ordinary inertial platforms. Such gravitational damping is provided by a rotating cavity containing a fluid that flows and settles in equilibrium.

(5) This gravitational damping is selected for non-linearity in order to achieve rapid settling following large angular changes during acquisition.

Such non-linearity is provided by a short circuit path for the fluid in the rotating cavity for large deflections.

Theoretical principles illustrated in FIGS. 1(a) and (b)

With reference now to the mechanical schematic diagram of FIG. 1(a) and the mechanical circuit diagram of FIG. 1(b), the components of a single axis system of the foregoing type comprise a casing 20 serving as ground for the system, a path deflecting prism 22, a resilient suspension 24 and a damping unit 26. In these diagrams:

$\theta_0$=the inertial space angular reference
$\theta_1$=the rotational angle of prism 22
$\theta_2$=the rotational angle of damping unit 26

$$K = \text{the spring constant or compliance} = \frac{\pi r^4 G}{2L}$$

where $r$=radius of spring wire
$G$=modulus of elasticity in shear
$L$=spring length $K_1$=the compliance of spring suspension 24
$K_2$=the residual compliance of damping uit 26
$S$=the Laplacian differential operator
$J$=inertia
$J_1$=inertia of the prism
$J_2$=inertia of the damping unit
$B$=the damping factor
$\Omega$=angular rate An expression for $\theta_1/\theta_2$, which represents instantaneous angularity with respect to ground, is derived as follows:
Assuming $K_2$ negligible:

$$\frac{\theta_1}{\theta_2} = \frac{\Omega_1(s)}{\Omega_0(s)} = \frac{\left(S + \frac{B}{J_2}\right)\frac{K}{J_1}}{S^3 + \frac{B(J_1+J_2)}{J_1+J_2}S^2 + \frac{K}{J_1}S + \frac{BK}{J_1J_2}}\bigg|_{S=0}^{S=1}$$

The assumption that $K_2$ is negligible may be justified as follows:
Considering that $K_2=ML$, where $M$=mass of an equivalent spring
$L$=length of an equivalent spring with reference to FIG. 1($b$):

$$ML \sin \theta_2 \cong ML\theta_2$$

$$W_0 = \sqrt{\frac{g}{L}}$$

where $g$=acceleration of gravity. $W_0$ is very large because $L$ is very small. Thus $B$ damps out $\theta_2$ oscillations and $\theta_2$ is constant. It follows that $K_2$ is negligible.
Now, assuming $\theta_2 \cong 0$ (i.e., $J_2 \to \infty$), since $$\sqrt{\frac{K_2}{J_2}} \gg \sqrt{\frac{K}{J_1}}$$

it follows that:

$$\frac{\theta_1}{\theta_2} = \frac{KS}{J_1} \frac{1}{S^3 + \frac{B}{J_1}S^2 + \frac{K}{J_1}S} = \frac{1}{\frac{J_1}{K}S^2 + \frac{B}{K}S + 1}$$

The embodiment of FIGS. 2 to 9

With reference now to FIG. 2, one of the oculars of the instrument of FIGS. 3 to 9 is shown as including an objective lens 30, a porro prism 32 and an eyepiece 34. Porro prism 32 includes two independent components 33, 35, each having a flat rectangular inner facet 36, trapezoidal side facets 38, 38 and a pair of oblique outer facets 40, 40, which are separated by a medial facet 42. The optical axis, which initially is established by objective lens 30 along direction 44, is deflected along directions 46, 48, 50 and finally is directed through eyepiece 34 along direction 52. It will be observed that directions 44, 48, 52 are relatively parallel and directions 46, 50 are relatively perpendicular.

In FIG. 2, a first prism component 33 is shown as being gimballed about its center of gravity by taut wire components 54 extending from its side facets to walls of the casing within which the system is contained. Similarly, prism component 35 is shown as being gimballed about its center of gravity by taut wire components 56 extending from its side facets to walls of the casing. The directions of taut wires 54 and 56 are shown as being perpendicular to each other. Supported also by each of taut wires 54, 56 is a toggle unit 58 and a damping unit 60.

As is best shown in FIGS. 6, 7 and 8, toggle unit 58 includes a disk 62 having three peripheral notches 64 at 135° intervals. Seated in each notch 64 is a projection 66 which is biased toward the center of disk 62 by a helical spring 68 that is anchored between the system housing as at 70 and the outer end of probe 66 as at 72. This housing structure provides negative compliance of the type referred to in connection with FIGS. 1($a$) and ($b$) above. The toggle arrangement is such as to provide solid prism support if the device is dropped but extreme flexibility about the axis of rotation. Although a compression toggle system is shown, it will be understood that alternatively a tension toggle system can be used.

Referring once again to FIGS. 6, 7 and 8, damping unit 60 is shown as being fixed to disk 62 and as including a metal disk 74 having at one face an annular groove 76. Clamped onto this face is a cover disk 78, which hermetically seals groove 76 with the aid of a resilient O-ring 80 within an annular seat 82. Within the annular chamber defined by annular groove 76 and cover plate 78 is a viscous fluid 84. In the illustrated embodiment, the fluid is a liquid. However, it is to be understood that in alternate embodiments the fluid is a powder or a multiplicity of minute ball bearings. It will be observed that the level of fluid 84 is approximately only as high as the vertical radius of inner portion 86 of disk 74. In accordance with the discussion of FIGS. 1($a$) and ($b$) above, minor rotational motions of damping unit 60 cause frictional drag at the interface between fluid 84 and annular groove 76 but without disturbing the illustrated fluid configuration, all motion of the fluid being substantially within within the lower region of annular channel 78 already containing it. However, any major motion causes the fluid to surge over the top of disk portion 86, in effect acting as a short circuit. In the form shown, disk 62, disk 74 and disk 78 are clamped to each other by nuts 88, 90, which are turned onto the ends of a screw 92 that projects through central holes in the disks. As shown, screw 92 is hollow for receipt of the taut wire portion 94 on which it is supported, this wire being soldered to the screw in order to achieve affixation.

Figure 4:
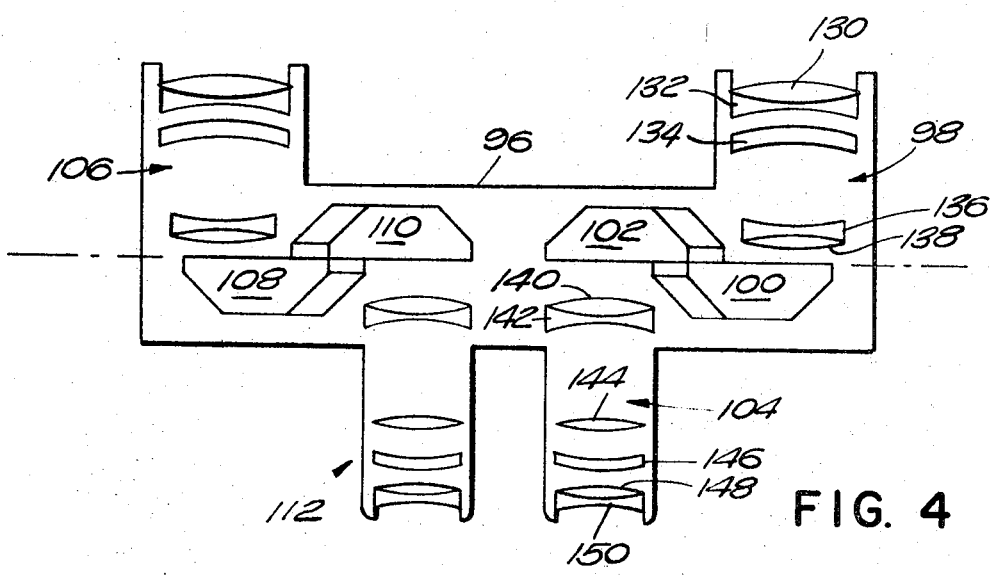
FIG. 4 is a top plan view of the binoculars of FIG. 3, with parts omitted for clarity.
Figure 5:
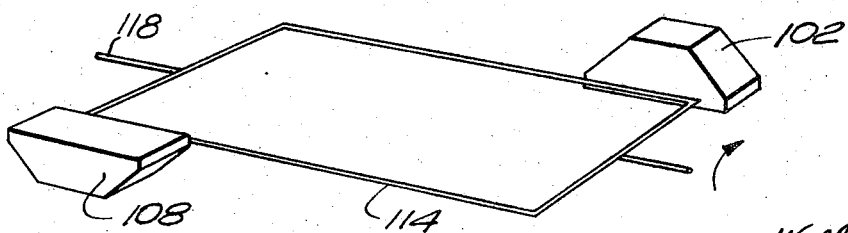
FIG. 5 is a perspective view of certain mechanical components of the binoculars of FIG. 3.

FIGS. 3, 4 and 5 illustrate the incorporation of two arrangements of the type discussed in connection with FIGS. 2, 6, 7 and 8 to provide motion compensated binoculars. As shown these binoculars include a housing 96 for mounting a right ocular and a left ocular. The right ocular includes a right objective lens 98, a right porro, including prisms 100, 102 and a right eyepiece 104. The left ocular includes a left objective lens 106, a left porro, including prisms 108, 110 and a left eyepiece 112. As shown, prisms 108, 102 are carried by a mount 114 which is suspended by a taut wire 118, the extremities of which are affixed to casing 96. Affixed to taut wire 118 is a negative compliance unit and a damping unit, all of the types described above in connection with FIGS. 6, 7 and 8. Prisms 110 and 100 are carried in a manner analogous to that of prisms 108 and 102.

Figure 9:
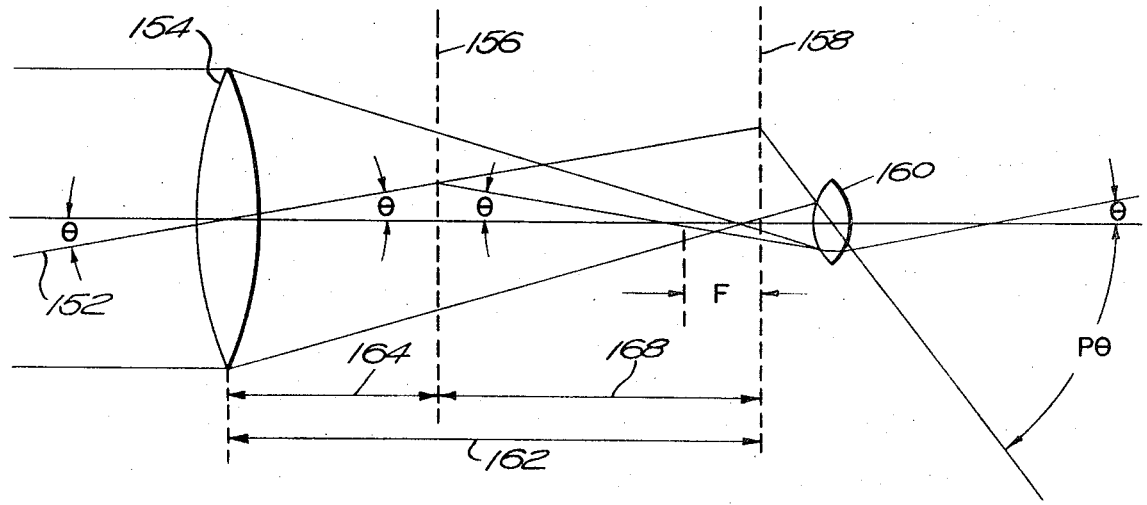
FIG. 9 is a schematic diagram illustrating certain principles of the optical system of the binoculars of FIG. 3.

As shown in FIG. 4, the optical system of the illustrated binoculars include typical binocular objective lenses and eyepieces. Each objective includes cemented positive and negative elements 130, 132, a spaced positive shell 134 and spaced cemented negative and positive elements 136, 138. Each eyepiece includes fixed cemented positive and negative elements 140, 142 and an adjustable unit including a positive element 144, a spaced shell 146 and spaced cemented positive and negative elements 148, 150. The operation of the optical system is illustrated in FIG. 9. An input ray 152 is defined as the ray passing through the optical center of objective 154, perpendicular to the effective reflecting plane of the porro prism unit in the plane of stabilization (the plane of the paper in FIG. 9). The input ray is reflected by the porro back on itself in the plane of stabilization so that it returns to the optical axis at exactly the same angle and at a point before the focal point at a distance equal to the eyepiece focal length. In this diagram, the 2:1 deflection plane containing the porro in collimated space is shown at 156 and the focal plane is shown at 158. The eyepiece is shown at 160. Where P=magnification and F= focal length of eyepiece 160, the distance 162 from objective plane 154 to focal plane 158 is given by PF, the distance from objective plane 154 to deflection plane 156 is given by $$\frac{P-1}{2}F$$

and the distance from deflection plane 156 to focal plane 158 is given by $$\frac{P+1}{2}F$$

For any magnification power: P, the baove geometrical relations ensure that the exit ray will be exactly parallel to the input ray, independently of optical axis motion. Thus the image seen through this optical system is stabilized in inertial space, i.e., will be seen as motion-free as if by the unaided eye, except with the desired magnification.

Operation of the embodiment of FIGS. 2 to 9

In operation, the binoculars of FIGS. 2 to 9 form stabilized images at the eyes of a user by virtue of the inertial characteristics of the prisms and the damping characteristics of the fluid chambers. These binoculars, although somewhat heavier than ordinary binoculars of corresponding design, are light enough to be conveniently used.

Figure 10:
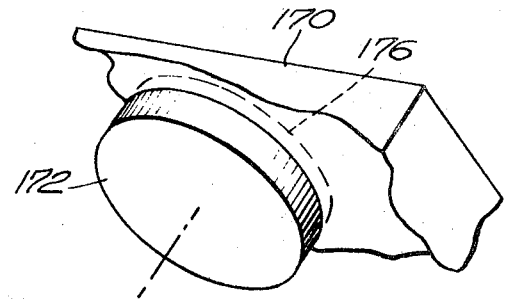
FIG. 10 is a broken away, perspective view of an alternative embodiment of the present invention.
Figure 11:
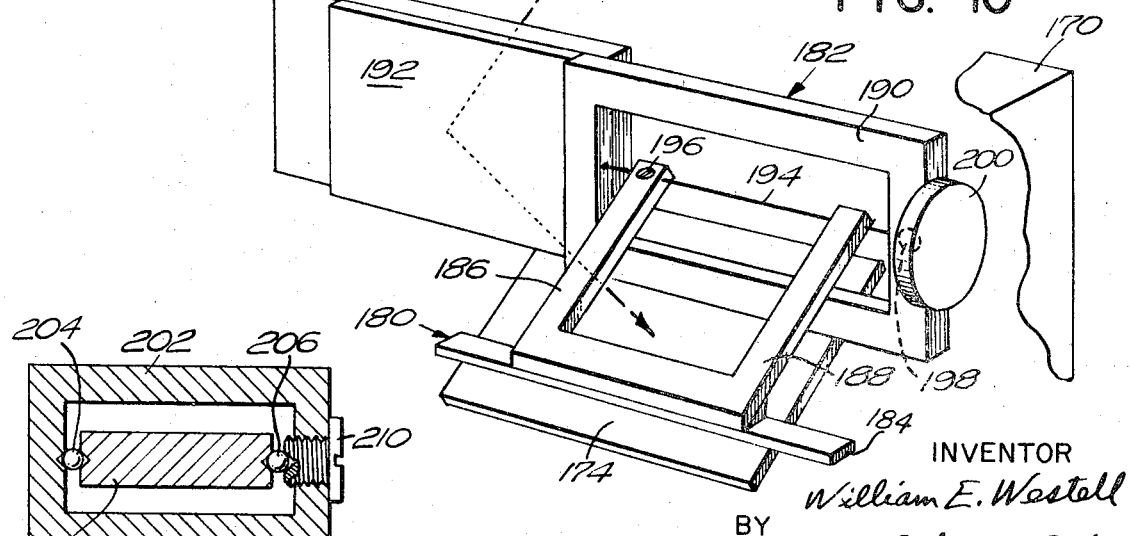
FIG. 11 is a broken away view of a modification of the embodiment of FIG. 10.

The embodiments of FIGS. 10 and 11

With reference now to FIGS. 10 and 11, FIG. 10 illustrates a camera, which comprises a light tight housing 170, an objective lens 176, a shutter 172 and a photosensitive film 174. A front surface mirror 178 establishes a folded optical path between object lens 176 and photosensitive film 174. The mount for front surface mirror 178 includes, in accordance with the present invention, a bracket 180 and a mount 182. Bracket 180, which is fixed to housing 170 as at 184, comprises a pair of obliquely extending arms 186, 188. Mount 182 includes a centrally open frame 190. A mirror support 192, which is affixed to one edge of frame 190, carries mirror 178 at an angle of 45° with respect to the axis of lens 176. A taut wire 194 extends from a bore at one edge of frame 190, through bores in arms 186, 188 of bracket 180 and to above in the opposed edge of frame 190, being affixed to the frame and the arms by setscrews 196, 198, which contact portions of the taut wire in the bores. Affixed to frame 190 and axially centered about taut wire 194 is a damping disk 200 of the type described above in FIGS. 7 and 8.

In operation, any small sudden rotational motion of the camera about the axis of taut wire 194 does not affect the inertial position of mirror 178 and, therefore, maintains a stationary image formed by lens 176 on photo-sensitive film 174. In the illustrated camera, it is assumed that the geometry is such that other motion has negligible effect. Also, as shown in FIG. 11, instead of a taut wire, resilient balls 204, 206 composed of spring metal are compressed by a screw 210 between notches in edges of a mirror mounting frame 202 and a housing bracket 208. Frame 202 is analogous to frame 182 of FIG. 10 and bracket 208 is analogous to bracket 180 of FIG. 10. Alternatively, the one or two axis mirror suspension and frame can be mounted externally such that optical angular deflection is substantially one to one with mechanical angular deflection.

What is claimed is:

1. An optical imaging system comprising base means, object lens means for establishing an image of a field of view on a focal surface means and means optically aligned with said lens and focal surface means for controlling the path between said object lens means and said focal surface means, said means comprising at least a deflection element, first mounting means affixed to said deflection element, second mounting means affixed to said base, mechanical damping means, said base and damping means having a springlike connection, and axial suspension mounting means connecting said first mounting means, said second mounting means, and said damping means, said axial suspension means permitting relative rotational movement along the axis thereof between said axial suspension mounting means and said second mounting means and preventing relative translational movement along the axis thereof between said axial suspension mounting means and said second mounting means, said deflection element being a reflecting element, said axial suspension mounting means including a taut wire extended between said second mounting means and said first mounting means, said damping means providing a disk shaped chamber axially centered on the axis of said axial suspension mounting means, a disk shaped core in said disk shaped chamber axially centered on the axis of said axial suspension mounting means, a fluid partially filling said disk shaped chamber, said disk shaped core causing said fluid to constitute a continuous medium at one part of said disk shaped chamber with surface portions that are spaced from each other by said disk shaped core, said fluid being capable of spilling from one of said surface portions to the other in the event of large and sudden movement of said optical imaging system, said axial suspension mounting means translating vibrations to said damping means as low frequency responses, said low frequency responses cancelling each other in said damping means.

2. An optical stabilizing system comprising a base, optical deflection means, a mechanical damping means, said base and damping means having a springlike connection, axial suspension means supporting said optical deflection means, said axial suspension means connecting said damping means to said optical deflection means, said axial suspension means permitting relative rotational movement of said optical deflection means about the axis thereof, said base, deflection means, damping means, and axial suspension means having physical properties interrelated in conformity with the expression $$\frac{\theta_1}{\theta_2} = \frac{1}{\frac{J_1}{K}S^2 + \frac{B}{K}S + 1}$$

wherein:

$\theta_1$ is the rotational angle of said deflection means,
$\theta_2$ is the rotational angle of said damping means,
K is the spring constant,
$J_1$ is the inertia of said deflection means,
B is the damping factor, and
S is the Laplacian differential operator;

said axial suspension means translating vibrations to said damping means as low frequency responses, said low frequency responses cancelling each other in said damping means.

3. An optical imaging system comprising base means, object lens means for establishing an image of a field of view on a focal surface means and a plurality of means optically aligned with said lens and focal surface means for controlling the path between said object lens means and said focal surface means, each optically aligned means of said plurality comprising at least a deflection element, first mounting means affixed to said deflection element, second mounting means affixed to said base, mechanical damping means, said base and damping means having a springlike connection, axial suspension means connecting said first mounting means, said second mounting means and said damping means, said axial suspension means permitting relative rotational movement about the axis thereof between said axial suspension means and said second mounting means and preventing relative translational movement along the axis thereof between said axial suspension means and said second mounting means, the axis of one of said plurality of optically aligned means being at an angle relative to the axis of another of said plurality of optically aligned means, said base, optically aligned means, damping means, and axial suspension means having physical properties interrelated in conformity with the expression $$\frac{\theta_1}{\theta_2} = \frac{1}{\frac{J_1}{K}S^2 + \frac{B}{K}S + 1}$$

wherein:

$\theta_1$ is the rotational angle of said optically aligned means,
$\theta_2$ is the rotational angle of said damping means,
K is the spring constant,
$J_1$ is the inertia of said optically aligned means,
B is the damping factor, and
S is the Laplacian differential operator;

said axial suspension means translating vibrations to said damping means as low frequency responses, said low frequency responses cancelling each other in said damping means.

4. The optical imaging system of claim 2, wherein said axial suspension mounting means includes a flexure element extended between portions of said base means.

5. The optical imaging system of claim 2, wherein said axial suspension means includes toggle means.

6. The optical imaging system of claim 2, wherein said damping means includes a disk shaped chamber axially centered on the axis of said axial suspension mounting means and a fluid in said chamber.

7. The optical imaging system of claim 2, wherein said damping means provides a disk shaped chamber axially centered on the axis of said axial suspension mounting means, a disk shaped core in said disk shaped chamber axially centered on the axis of said axial suspension mounting means, a fluid partially filling said disk shaped chamber, said disk shaped core causing said fluid to constitute a continuous medium at one part of said disk shaped chamber with surface portions that are spaced from each other by said shaped core, said fluid being capable of spilling from one of said surface portions to the other in the event of large and sudden movement of said optical imaging system.

8. The optical imaging system of claim 3, wherein said axial suspension mounting means includes a taut wire extended between said second mounting means and said first mounting means.

9. The optical imaging system of claim 3, wherein said axial suspension mounting means includes compression elements interposed between adjacent portions of said second mounting means and said first mounting means.

10. The optical imaging system of claim 3, wherein mechanical short circuit means are provided to speed the operation of said damping means in the event of large and sudden motion of said optical imaging system.

11. The optical imaging system of claim 3, wherein said damping means provides a disk shaped chamber axially centered on the axis of said axial suspension mounting means, a disk shaped core in said disk shaped chamber axially centered on the axis of said axial suspension mounting means, a fluid partially filling said disk shaped chamber, said disk shaped core causing said fluid to constitute a continuous medium at one part of said disk shaped chamber with surface portions that are spaced from each other by said disk shaped core, said fluid being capable of spilling from one of said surface portions to the other in the event of large and sudden movement of said optical imaging system.

12. The optical imaging system of claim 3, wherein said angle is a right angle.

References Cited

UNITED STATES PATENTS

| | | | |
|---|---|---|---|
| 2,779,231 | 1/1957 | Prodofsky | 356—250 |
| 2,939,363 | 6/1960 | Kaestner | 350—16 |
| 2,944,783 | 7/1960 | Macleish et al. | 360—16 |
| 3,014,283 | 12/1961 | Hofmann | 356—250 |
| 3,058,396 | 10/1962 | Tsubokawa | 356—250 |
| 3,251,262 | 5/1966 | Ellenberger | 356—250 |
| 3,413,858 | 12/1968 | Samet | 350—16 |
| 2,938,422 | 5/1960 | Hardy | 356—250 |
| 3,055,264 | 9/1962 | Hunter | 356—250X |

PAUL R. GILLIAM, Primary Examiner